United States Patent
Ono et al.

(10) Patent No.: US 6,309,726 B1
(45) Date of Patent: Oct. 30, 2001

(54) OPTICAL RECORDING MEDIUM

(75) Inventors: Toshitsugu Ono; Hirofumi Kondo, both of Miyagi; Tetsuhiro Sakamoto, Chiba, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/350,723

(22) Filed: Jul. 9, 1999

(30) Foreign Application Priority Data

Jul. 9, 1998 (JP) .................................................. 10-194537
Oct. 30, 1998 (JP) .................................................. 10-311473

(51) Int. Cl.$^7$ ....................................................... B32B 3/02
(52) U.S. Cl. ..................... 428/64.1; 428/64.2; 428/64.4; 428/702; 428/913; 430/270.11; 430/495.1; 430/945; 369/283; 369/288
(58) Field of Search ................................. 428/64.1, 64.2, 428/64.4, 688, 698, 702, 913; 430/270.11, 495.1, 945; 369/283, 288

(56) References Cited

U.S. PATENT DOCUMENTS

| 5,091,269 | * | 2/1992 | Kondo ................................... 428/695 |
| 5,284,884 | | 2/1994 | Ueyama . |
| 5,604,032 | * | 2/1997 | Kai ......................................... 428/336 |
| 5,714,222 | * | 2/1998 | Yokoyama ........................... 428/64.1 |

FOREIGN PATENT DOCUMENTS 42 22 448 A1   8/1992   (DE) .

OTHER PUBLICATIONS

Abstract of Japanese Patent No. 10-110118 (XP-002120601).
Abstract of Japanese Patent No. 03-049053 (XP-002120602).
Abstract of Japanese Patent No. 01-035722 (XP-002120603).
Abstract of Japanese Patent No. 01-033719 (XP-002120604).
Abstract of Japanese Patent No. 03-176832 (XP-002120605).

\* cited by examiner

*Primary Examiner*—Elizabeth Evans
(74) *Attorney, Agent, or Firm*—Sonnenschein, Nath & Rosenthal

(57) ABSTRACT

An optical recording medium incorporating a supporting body; a recording portion which is formed on either main surface of the supporting body and on which a signal is recorded; and a light permeable layer formed on the recording portion, wherein light is applied from a position adjacent to the light permeable layer to record/reproduce a signal, and carboxylic acid amine salt expressed by general formula (1) and/or general formula (2) is held on the surface which is irradiated with light

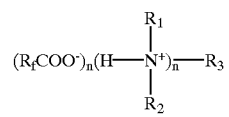

(1)

where n is an integer from 1 to 3, each of R1 and R2 is hydrogen or a hydrocarbon group, R3 is a hydrocarbon group and $R_f$ is a perfluoroalkyl group having three or more carbon atoms,

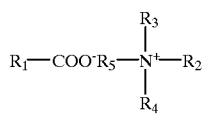

(2)

where at least either of $R_1$ and $R_2$ is perfluoroalkyl group having three or more carbon atoms, at least any one of $R_1$, $R_2$, $R_3$, $R_4$ and $R_5$ is hydrocarbon group having 12 or more carbon atoms and the rest of them are hydrogen or hydrocarbon group.

38 Claims, 8 Drawing Sheets

OPTICAL RECORDING MEDIUM

RELATED APPLICATION DATA

The present application claims priority to Japanese Application No. P10 194537 filed Jul. 9, 1998, and Japanese Application No. 10 311473 filed Oct. 30, 1998 which applications are incorporated herein by reference to the extent permitted by law.

BACKGROUND OF THE INVENTION

1. Field of the Invention

The present invention relates to an optical recording medium incorporating a recording portion, which is formed on either main surface of a supporting body and on which a signal is recorded, and a light permeable layer formed on the recording portion and arranged to apply light from a position adjacent to the light permeable layer to record and/or reproduce an information signal.

2. Description of the Related Art

An optical recording medium has been suggested which is capable of continuing a recording operation or a reproducing operation for four hours on one side thereof by employing an NTSC (National Television System Committee) method. The foregoing optical recording medium has a function to serve as a new recording medium which is substituted for the video cassette for use in a present VTR (Video Tape Recorder).

On the other hand, the optical recording medium has been required to have the shape and size which are similar to those of the CD (Compact Disc) so as to be a product which is free from uncomfortability for a user who has been accustomed to the easiness and ease-of-use of the CD. The optical recording medium must be formed into the disc-shape recording medium similar to the CD to be capable of using the random access and the quick access which are the greatest characteristics of the disc shape medium. Thus, a small and easy recording medium can be formed. Moreover, the optical recording medium is required to be a product which is capable of instantaneously performing recording and reproducing and which has a multiplicity of functions including a trick play and a quick editing characteristic.

The optical recording medium must have a variety of performance and characteristics so as to be used as a next-generation recording medium as described above. For example, a storage capacity of 8 GB or greater is required.

The conventional optical recording medium, however, has a poor storage capacity which is smaller than 8 GB. As a conventional optical recording medium, the DVD (Digital Versatile Disc) has been suggested. The DVD has a recording wavelength $\lambda$ of 0.65 $\mu$m and an NA (Numerical Aperture) of 0.6. The DVD has a recording capacity of 4.7 GB.

To make the signal formats including ECC (Error Collection Code) to be similar to those of the DVD and to enlarge the storage capacity to 8 GB or greater, the optical recording medium must satisfy the following relational expression:

$$4.7 \times (0.65/0.6 \times NA/\lambda)^2 \geq 8$$

By solving the foregoing relational expression, $NA/\lambda \geq 1.20$. To enlarge the recording capacity of the optical recording medium to be 8 GB or greater, enlargement of the numerical aperture NA and shortening of the recording wavelength $\lambda$ of the optical recording medium are required.

When, for example, the numerical aperture NA of the optical recording medium is enlarged, an allowance of an angle (a tilt angle) which is deviation of the surface of the disc from the optical axis of an optical pickup is undesirably reduced. An influence of the foregoing tilt angle is easily exerted on the aberration of the optical recording medium produced owning to the thickness of the disc shape optical recording medium. To record/reproduce a signal stably, the thickness of a light permeable layer, through which irradiation light passes, must, therefore, be reduced. Moreover, irregularity in the thickness of the light permeable layer of the optical recording medium must be not larger than a predetermined value because of the foregoing reasons.

When the thickness of the light permeable layer of the optical recording medium is reduced as described above, an advantage can be realized. On the other hand, an adverse and critical influence of a flaw formed on the surface of the disc or dust is exerted. Therefore, there arises a problem in that a signal cannot be easily recorded/reproduced. When recording and/or reproducing of the optical recording medium having a raised recording density is performed by using an optical system having a large numerical aperture NA, the working distance which is the distance from an objective lens and the surface of the disc must be shorter than that of the conventional optical recording medium. At this time, the possibility of conflict between the surface of the disc and the objective lens is raised. Thus, a flaw is easily developed. At this time, charging of the disc, which is the optical recording medium, causes the amount of dust or the like to undesirably be enlarged. Therefore, the optical recording medium has a problem in that recording and/or reproducing errors increase owning to the flaw and the dust.

SUMMARY OF THE INVENTION

Accordingly, an object of the present invention is to provide an optical recording medium which is capable of preventing development of a flaw on the disc surface thereof and adhesion of dust or the like so that recording and/or reproducing errors are prevented.

To achieve the foregoing object, according to one aspect of the present invention, it is provided that there is an optical recording medium comprising: a supporting body; a recording portion which is formed on either main surface of the supporting body and on which a signal is recorded; and a light permeable layer formed on the recording portion, wherein light is applied from a position adjacent to the light permeable layer to record/reproduce a signal, and carboxylic acid amine salt expressed by general formula (1) and/or general formula (2) is held on the surface which is irradiated with light:

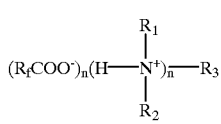

(1)

where n is an integer from 1 to 3, each of $R_1$ and $R_2$ is hydrogen or a hydrocarbon group, $R_3$ is a hydrocarbon group and $R_f$ is a perfluoroalkyl group having three or more carbon atoms,

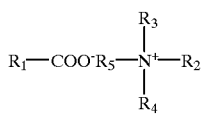

(2)

where at least either of $R_1$ and $R_2$ is perfluoroalkyl group having three or more carbon atoms, at least any one of $R_1$, $R_2$, $R_3$, $R_4$ and $R_5$ is hydrocarbon group having 12 or more carbon atoms and the rest of them are hydrogen or hydrocarbon group.

Other objects, features and advantages of the invention will be evident from the following detailed description of the preferred embodiments described in conjunction with the attached drawings.

DESCRIPTION OF THE PREFERRED EMBODIMENTS

Embodiments of the present invention will now be described. Hereinafter, a disc-shape optical recording medium has a structure that light is applied from a position adjacent to a light permeable layer formed on a supporting body having a signal information portion to read or record a signal. The present invention is not limited to the foregoing structure. The present invention may be applied to any one of a variety of optical recording mediums formed into a card shape, a sheet shape and the like.

Figure 1:
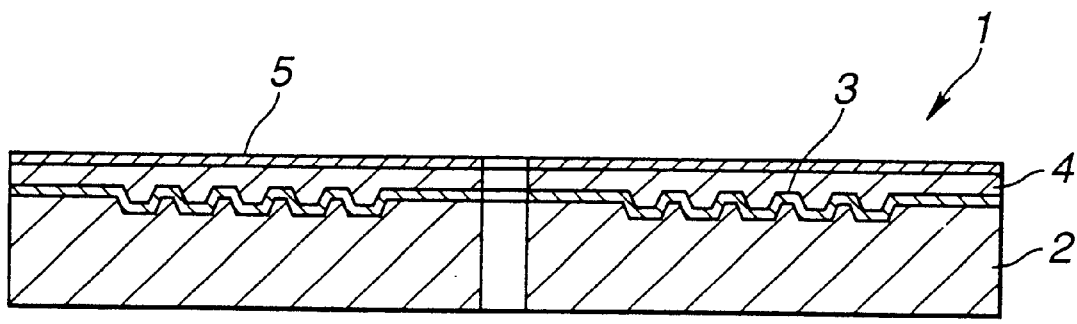
FIG. 1 is cross sectional view showing an embodiment of an optical recording medium according to the present invention.

FIG. 1 shows an example of the structure of an optical disc according to this embodiment. The optical disc 1 incorporates a substrate 2, a reflecting film 3 formed on either main surface of the substrate 2, a light permeable layer 4 formed on the reflecting film 3 and a surface layer 5 formed on the light permeable layer 4.

The substrate 2 is manufactured by injection-molding resin, such as polycarbonate. The optical disc 1, which is a ROM (Read Only Memory) type disc, has a predetermined projection and depression pattern corresponding to information signals and integrally molded with the substrate 2 when the substrate 2 is molded by the injection molding process.

The reflecting film 3 is obtained by forming an Al film on the surface of the substrate 2 on which the projection and depression pattern has been formed.

The light permeable layer 4 is formed on the reflecting film 3 and made of ultraviolet curing resin or the like. The material of the light permeable layer 4 is exemplified by SD301 manufactured by Dai-Nippon Ink. The signal is reproduced from the optical disc 1 by applying light from a position adjacent to the light permeable layer 4.

To record/reproduce the optical disc 1 at a high recording density, an optical system incorporating an objective lens having a high NA as described later is required. In the foregoing case, the distance from the objective lens to the recording and/or reproducing surface of the optical disc 1, that is, the distance to the surface on which light is made incident, that is, the working distance must be shorter than that of the conventional optical disc. When the working distance has been shortened, there is apprehension that the objective lens conflicts with the surface of the optical disc 1 on which light is made incident and damages the foregoing surface.

The optical disc 1 incorporates the surface layer 5 formed on the light permeable layer 4 and having light permeability and predetermined hardness. The surface layer 5 is made of inorganic material, such as $SiN_x$, $SiO_x$ or SiC. The foregoing inorganic material has sufficient hardness to prevent contact of the optical disc 1 with the objective lens and damage of the optical disc 1.

It is preferable that the thickness of the surface layer 5 is 1 nm to 200 nm. Specifically, the thickness is, for example, 100 nm. If the thickness of the surface layer 5 is smaller than 1 nm, development of a flaw caused from contact with the objective lens cannot satisfactorily be prevented. If the thickness of the surface layer 5 of the optical disc 1 is larger than 200 nm, the distance from the objective lens and the surface of the projection and depression pattern of the substrate 2 on which signals have been recorded is enlarged excessively to realize high-density recording.

It is preferable that the surface hardness of the surface layer 5 is such that the pencil hardness is H or harder. A fact has been confirmed in collision tests with the pickup that the optical disc 1 is not damaged owning to collision with the objective lens if the pencil hardness of the surface of the optical disc 1 on which the light is made incident is H or harder. It is further preferable that the pencil hardness of the surface layer 5 is 2H or harder. When the pencil hardness of the surface layer 5 is 2H or harder, development of a flaw caused from contact between the objective lens and the surface of the optical disc 1 on which light is made incident can effectively be prevented.

It is preferable that the surface layer 5 has conductivity. When the thickness of the light permeable layer 4 of the optical disc 1 is too small, adhesion of dust or the like easily occurs. Therefore, the surface layer 5 must have an antistatic effect. When the surface layer 5 of the optical disc 1 has the conductivity, electrification of the surface on which light is made incident can be prevented. Thus, adhesion of dust or the like can be prevented. When the surface layer 5 is made of, for example, indium oxide, tin oxide, their complexes or amorphous carbon, sufficient conductivity can be realized. The thickness of the surface layer 5 is, for example, about 50 nm.

The optical disc 1 is structured such that carboxylic acid amine salt expressed by general formula (1) and/or general formula (2) is held on the surface of the surface layer 5:

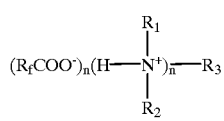
(1)

where n is an integer from 1 to 3, each of $R_1$ and $R_2$ is hydrogen or a hydrocarbon group, $R_3$ is a hydrocarbon group and $R_f$ is a perfluoroalkyl group having three or more carbon atoms,

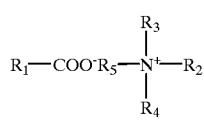
(2)

where at least either of $R_1$ and $R_2$ is perfluoroalkyl group having three or more carbon atoms, at least any one of $R_1$, $R_2$, $R_3$, $R_4$ and $R_5$ is hydrocarbon group having 12 or more carbon atoms and the rest of them are hydrogen or hydrocarbon group.

Since the optical disc 1 has the structure that carboxylic acid amine salt expressed by general formula (1) and/or general formula (2) is held on the surface layer 5, the electric resistance and coefficient of friction of the surface can be reduced.

The carboxylic acid amine salt is prepared from, for example, perfluoroalkyl carboxylic acid and organic amine. The carboxylic acid amine salt, into which long-chain and hydrophobic amine salt has been introduced, has satisfactory solubility with respect to organic solvent, such as alcohol or hexane. Since the long-chain and hydrophobic amine has been introduced into the carboxylic acid amine salt, the surface energy can be reduced. Thus, when the carboxylic acid amine salt is employed as a lubricant, satisfactory lubricating effect can be obtained to reduce the coefficient of fiction. Therefore, the carboxylic acid amine salt is a practical material to serve as a lubricant for the surface of the optical disc 1.

Since the carboxylic acid amine salt contains two chains in each molecule thereof, great entanglement of molecules takes place. Therefore, shearing force among the molecules is enlarged so that a satisfactory effect of improving the durability is obtained.

The carboxylic acid amine salt has ion bonds in the molecule thereof Therefore, the carboxylic acid amine salt has large adhesion to the surface layer 5 of the optical disc 1, thus causing the lubricating effect to be maintained for a long time if the probability of collision between the optical disc 1 and the objective lens is raised. As a result, a satisfactory advantage can be realized in that the durability of the optical disc 1 can be improved. The degree of the adhesion is enhanced when the surface layer 5 is made of the inorganic material, such as $SiN_x$, SiC or $SiO_x$.

Since the carboxylic acid amine salt contains ion bonds in the molecules thereof, the electric conductivity of the surface of the optical disc 1 can effectively be lowered. When the probability of collision between the optical disc 1 and the objective lens has been raised, the surface becomes to have conductivity. As a result, adhesion of dust or the like can be prevented. Therefore, increase in errors occurring in recording and/or reproducing operation can be prevented.

It is preferable that the number n of the perfluoroalkyl carboxylic acid and the organic amine expressed in formula (1) is 1 to 3. If the number n is zero, the lubricant cannot be constituted. If the number n is 4 or more, problems arises in practicality, such as handling of the lubricant. For example, coating of a very thin lubricant layer cannot easily be performed.

It is preferable that the perfluoroalkyl group ($R_f$ in the general formula) which constitutes the perfluoroalkyl carboxylic acid expressed in formula (1) has three or more carbon atoms. If the number of carbon atoms in the perfluoroalkyl group is less than 3, the lubricating effect from introduction of fluorine cannot be obtained. Although the maximum number of carbon atoms is not limited, there arises a problem in that the lubricant cannot easily be performed if the number of carbon atoms is larger than 12. The shape of the perfluoroalkyl group may be either of a straight-chain shape or a branched shape.

In formula (1), each of $R_1$ and $R_2$ is hydrogen or a hydrocarbon group and $R_3$ is a hydrocarbon group. In the foregoing case, the hydrocarbon group may be an alkyl group, an alkene group or an aryl group. According to circumstances, the hydrocarbon group may be a heterocyclic compound. It is preferable that the number of carbon atoms in the hydrocarbon group is one or more. It is preferable that any one of $R_1$, $R_2$ and $R_3$ is 10 or more. As a result, the entanglement among molecules is enhanced so that a satisfactory effect of improving the durability is obtained.

It is preferable that the perfluoroalkyl group expressed in formula (2) has three or more carbon atoms. If the number of carbon atoms in the perfluoroalkyl group is smaller than three, the lubricating effect attempted to be obtained by introducing fluorine cannot be obtained. Although the maximum number of the carbon atoms is not limited, there arises a problem in that the lubricant of the foregoing type cannot easily be handled if the number of carbon atoms is larger than 12. The shape of the perfluoroalkyl group may be either of a straight-chain shape or a branched shape.

At least any one of $R_1$, $R_2$, $R_3$, $R_4$ and $R_5$ has a hydrocarbon group having 12 or more carbon atoms and introduced thereto. Therefore, excellent solubility with respect to organic solvent, such as alcohol or hexane, can be realized. Therefore, the surface energy of the optical disc 1 can be reduced. Thus, when the carboxylic acid amine salt is employed as a lubricant, satisfactory lubricating effect can be obtained to reduce the coefficient of friction.

The hydrocarbon group expressed in formula (2) may be any one of a saturated hydrocarbon, unsaturated hydrocarbon group or an aromatic hydrocarbon group. To obtain satisfactory lubricant effect, it is preferable that at least one hydrocarbon group is a long-chain hydrocarbon group.

Although the carboxylic acid amine salt may solely be employed as the lubricant, the carboxylic acid amine salt may be combined with a conventional lubricant. As an alternative to this, the carboxylic acid amine salt may be combined with perfluoroalkyl carboxylate ester, carboxylic acid perfluoroalkyl ester, perfluoroalkyl carboxylic acid perfluoroalkyl ester or their derivatives.

It is preferable that the dynamic coefficient of friction of the surface of the optical disc 1, that is, the surface of the surface layer 5 is 0.3 or smaller. As a result, if the optical disc 1 is brought into contact with the objective lens and undesirably sliding state is realized, the surface cannot be damaged.

The optical disc 1 according to this embodiment has the surface layer 5, which is the surface of the medium, is applied with the foregoing carboxylic acid amine salt. To apply the carboxylic acid amine salt to the surface of the medium, solution obtained by dissolving the carboxylic acid amine salt in solvent is applied to the surface of the medium. As an alternative to this, the foregoing solvent may be sprayed to the surface of the medium. When the optical disc 1 is immersed in the foregoing solution, the carboxylic acid amine salt can be held on the surface of the medium.

The material of the surface layer 5 is not limited to the foregoing inorganic material. For example, organic resin, such as acrylic urethane type ultraviolet curing resin, may be employed. When the surface layer 5 is made of the organic resin, the organic resin is applied to the surface of the light permeable layer 4 by a spin coating method. Then, the organic resin is dried.

When the surface layer 5 is made of the organic resin, it is preferable that the thickness of the organic resin is 0.1 $\mu$m to 10 $\mu$m. If the thickness of the surface layer 5 is larger than 10 $\mu$m, irregularity in the thickness easily occurs. If the thickness of the surface layer 5 is smaller than 0.1 $\mu$m, the effect of raising the surface hardness of the optical disc 1 cannot be satisfactorily obtained. Therefore, when the thickness of the surface layer 5 is made to be 0.1 $\mu$m to 10 $\mu$m, the surface hardness of the optical disc 1 can be raised such that irregularity in the thickness can be prevented.

When the surface layer 5 is made of the organic resin, it is preferable that powder of oxide of at least any one of In, Sn and Zn is mixed. When powder of metal oxide is mixed as described above, the electric resistance can be lowered. Thus, the antistatic effect can be improved.

It is preferable that the electric resistance of the surface the optical disc 1, that is, the surface of the surface layer 5 is $10^{13} \Omega$ or lower. Since the electric resistance of the surface of the medium is $10^{13} \Omega$ or lower, a satisfactory antistatic effect can be obtained.

When the surface layer 5 is made of the organic resin, wettability between the surface layer 5 and the light permeable layer 4 must be considered. Therefore, it is preferable that a material having a surface tension lower than the critical surface tension of the light permeable layer 4 is employed as disclosed in Japanese Patent Laid-Open No. 6-52576 "OPTICAL RECORDING DISC AND MANUFACTURING METHOD THEREFOR". When the surface layer 5 is made of the material having the surface tension lower than the critical surface tension of the light permeable layer 4, wetting of the interface between the light permeable layer 4 and the surface layer 5 can be prevented. Thus, the adhesiveness between the light permeable layer 4 and the surface layer 5 can be maintained.

When the light permeable layer 4 is made of the ultraviolet curing resin and the surface layer 5 is made of the organic resin, it is preferable that the water absorption of each of the foregoing layers is adjusted to meet the purposes of the layers. Since corrosion of the reflecting film 3 must be prevented, it is preferable that the light permeable layer 4 is made of a material having a relatively low water absorption. The hardness of the surface of the surface layer 5 on which light is made incident must be raised and electrification must be prevented. Therefore, the surface layer 5 must have a high electric conductivity. To achieve this, it is preferable that ions contributing to the electric conductivity are contained in the surface layer 5. Therefore, the surface layer 5 must be made of a material having water absorption which is higher than that of the light permeable layer 4.

Figure 2:
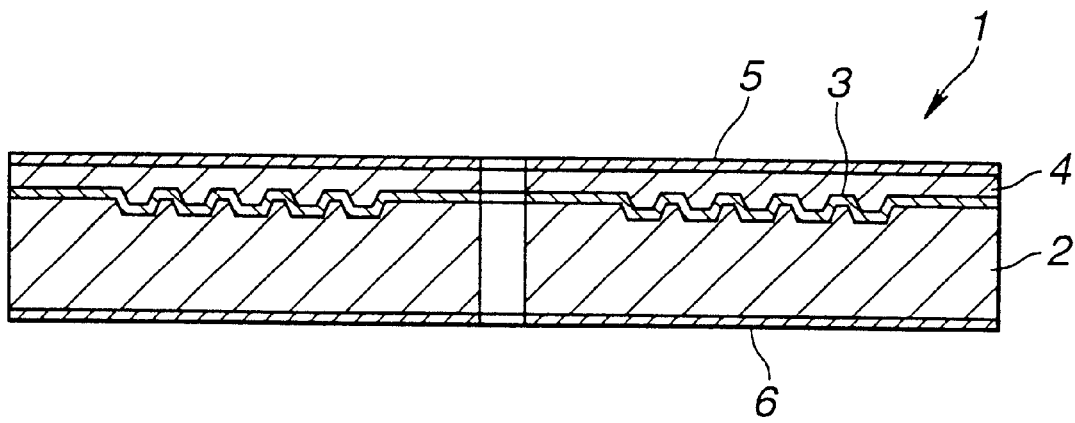
FIG. 2 is a cross sectional view showing another embodiment of the optical recording medium according to the present invention.

As shown in FIG. 2, the optical disc 1 may have a skew-correction body 6 which is formed on the surface of the substrate 2 opposite to the surface on which the light permeable layer 4 has been formed. When the skew-correction body 6 is provided, occurrence of skew of the optical disc 1 can be prevented. The skew-correction body 6 is made by, for example, applying and curing the ultraviolet curing resin. In the foregoing case, the material of the skew-correction body 6 may be made of the same material as that of the light permeable layer 4 or a material having a coefficient of contraction caused from curing and lower than that of the material of the light permeable layer 4.

The requirements for raising the recording density of the foregoing optical disc 1 will now be described.

In general, the disc skew margin $\Theta$, the wavelength $\lambda$ of the recording optical system, the numerical aperture NA and the thickness t of the light permeable layer 4 have the correlation. The relationship among the foregoing parameters and $\Theta$ with reference to a compact disc (CD), the practical playerbility of which has been confirmed, has been disclosed in Japanese Patent Laid-Open No. 3-225650. According to the foregoing disclosure, the following relationship is required:

$$|\Theta| \leq 84.115(\lambda NA^3/t)$$

The foregoing fact may be applied to the optical disc 1 according to this embodiment.

It is preferable that a specific limit value of the skew margin $\Theta$ which must be employed when the optical discs 1 are mass-produced is 0.4°. If the skew margin $\Theta$ is smaller than the foregoing value, the manufacturing yield is lowered and, therefore, the cost reduction cannot be realized. The skew margins of the conventional recording mediums are such that the CD has a value of 0.6° and the DVD has a value of 0.4°.

When the preferred thickness of the light permeable layer 4 for use in state of a short wavelength of light and a high numerical aperture NA is calculated in a state in which $\Theta=0.4°$, the numerical aperture NA must be 0.78 or greater in a state where $\lambda=0.65$ $\mu$m. Therefore, the thickness t must satisfy $t \leq 288$ $\mu$m.

Assuming that $\mu=0.4$ $\mu$m because shortening of the wavelength of light in the future must be expected, thickness t≦177 μm if the relationship NA≧0.78 is not changed. Since the production facilities for the CD or the like incorporating the substrate 2 having a thickness of 1.2 mm are used, a maximum thickness of the optical disc 1 according to this embodiment is 1.38 mm.

When modulation of the magnetic field of the optical magnetic disc is considered, the thickness of the light permeable layer 4 must be minimized. If the thickness is, for example, 30 μm, recording and/or reproducing of the optical magnetic disc can easily be performed.

The lower limit of the thickness of the light permeable layer 4 may be determined by the protective function of the light permeable layer 4 for protecting the recording film or the reflecting film 3. When the reliability and an influence of collision of a two-group lens to be described later are considered, it is preferable that the thickness is 10 μm or larger.

As described above, the value of NA/μ must be enlarged to raise the recording density of the optical disc 1. To realize a recording capacity of, for example, 8 GB, NA must be 0.7 or larger and the wavelength λ of light must be 0.68 μm or shorter. The thickness of the light permeable layer 4 and the skew has the above-mentioned relationship. In consideration of a necessity of adaptation to the present red laser beam to blue laser beam which is expected to widely be used in the future, it is preferable that the thickness t of the light permeable layer 4 is 10 μm to 177 μm.

To realize the recording capacity of 8 GB, the track pitch P and the linear density d must be changed as follows:

$$(0.74/P) \times (0.267/d) \times 4.7 \geq 8 d \leq 0.1161P \text{ bit}/\mu m$$

When P=0.56 μm, d≦0.206 bit/μm. The foregoing value is determined with reference to the ROM (Read Only Memory) of the DVD. When adoption of progresses of the signal processing technique for use to perform recording and/or reproducing (specifically, PRML (Partial Response Maximum Likelihood and reduction in the redundancy of the ECC) is considered, an increase of the linear density of about 15% is estimated. Therefore, the track pitch can be increased. Therefore, the maximum track pitch P is 0.64 μm.

Also the allowance for pitch change Δp is made to be severer. When the recording and/or reproducing parameters for the CD and DVD are used as they are, the P=0.74 μm and the allowance is ±0.03. Therefore, the following relationship is obtained:

$$|\Delta p| \leq 0.03P/0.74 = 0.04P$$

Therefore, when P=0.56, |Δp|≦0.023 μm.

Also the irregularity in the thickness of the light permeable layer 4 must have an excellent accuracy. When the thickness of the light permeable layer 4 is deviated from the design center of the objective lens for use in a recording and/or reproducing operation, the amount of aberration which is exerted from the irregularity in the thickness on the spot is in proportion to fourth power of NA.

Therefore, when the recording density is raised by enlarging NA or by shortening the wavelength, the irregularity of the thickness of the light permeable layer 4 is more strictly limited. Specifically, CD having an NA=0.45 has been put into practical use. The standardized irregularity in the thickness of the light permeable layer 4 is ±100 μm.

The DVD has been standardized such that the NA=0.6 and the irregularity in the thickness of the light permeable layer 4 is ±30 μm. With reference to an allowance of +100 μm of the CD, the following expression can be obtained:

$$|\Delta t| = (0.45/NA)^4 \times (\lambda/0.78) \times 100$$

$$= 5.26 \times (\lambda/NA^4) \mu m$$

Figure 3:
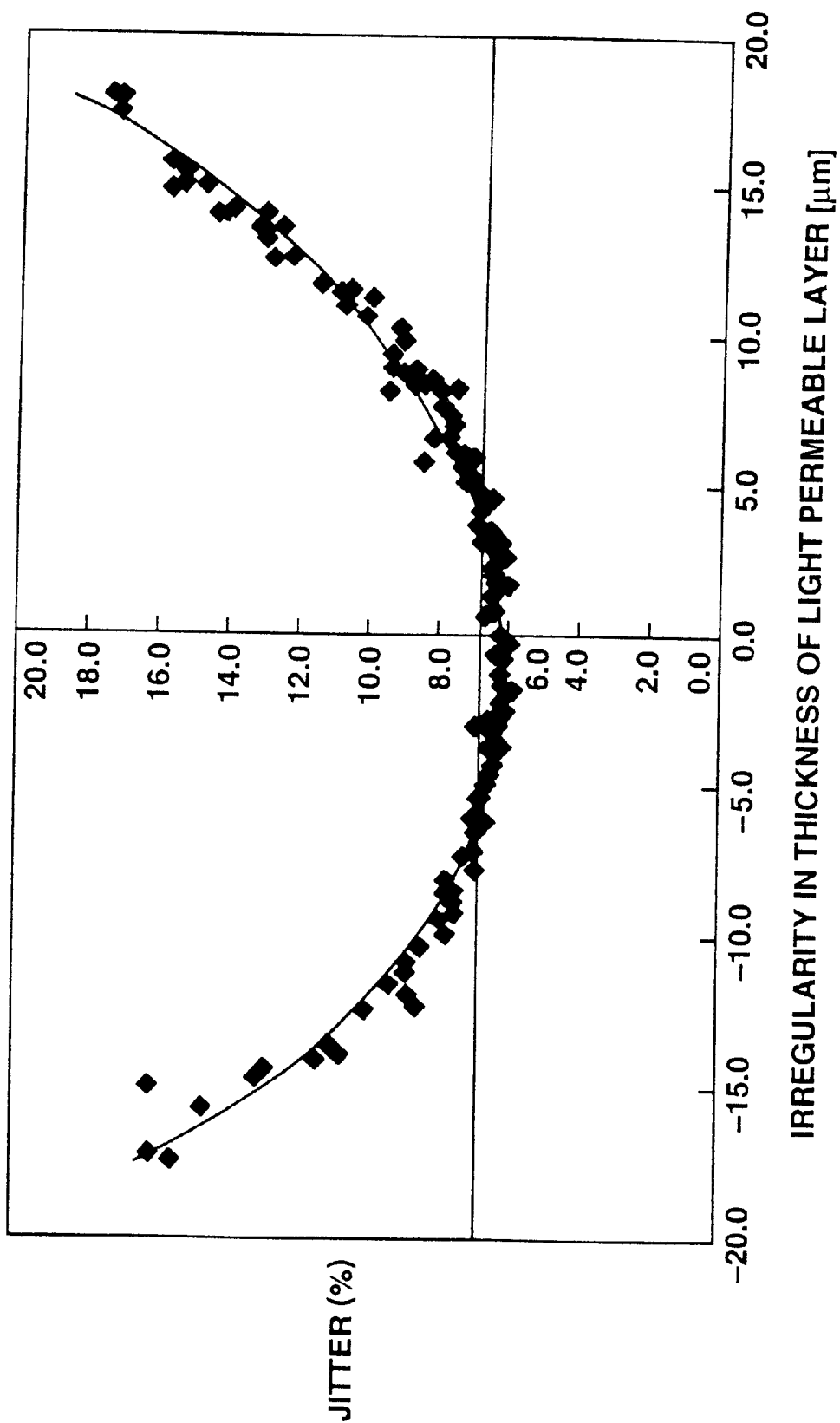
FIG. 3 is a graph showing the relationship between errors of the thickness of a light permeable layer and jitter values.

FIG. 3 shows results of experiments about the relationship between the irregularity in the thickness of the light permeable layer and jitter values such that the wavelength was made to be 0.68 μm and numerical aperture was made such that NA=0.875 when the central value of the thickness of the light permeable layer 4 was 100 μm.

As can be understood from FIG. 3, when, for example, a DVD is free from perturbation, such as skew, the value of the jitter is 8% which is a reference value. Therefore, the irregularity in the thickness of the light permeable layer 4 is ±7 μm. The foregoing value substantially coincides with the value obtainable from the foregoing equation. Therefore, the irregularity |Δt| allowed for the thickness t of the light permeable layer 4 to raise the recording density must be $5.26 \times (\lambda/NA^4)$ μm or smaller.

The irregularity in the thickness of the light permeable layer 4 is considered on the precondition that recording and/or reproducing light is uniform over the surface of the disc which is irradiated with light. When the focal point is shifted, the aberration can be corrected If the light permeable layer 4 has irregularity in the thickness thereof in the foregoing region (in the spot), the irregularity cannot be corrected by adjusting the focal point. Therefore, the foregoing amount of the irregularity must be limited to foregoing ±3λ/100 with respect to the central value of the thickness.

Also eccentricity E with respect to the value of 50 μm of the DVD is as follows:

$$E \leq 50 \times P/0.74 = 67.57P \mu m$$

The requirements to obtain the high-density optical disc 1 having the recording capacity of 8 GB are summarized as follows:

Recording and Reproducing Optical System:
λ<0.68 μm
NA/λ≦1.20
Thickness of Light Permeable Layer:
t=10 μm 177 μm
Irregularity of Thickness of Light Permeable Layer:
|Δt|≦5.26(λ/NA$^4$) μm
Track Pitch P≦0.64 μm
Allowance |Δp|≦0.04P
Linear Density d≦0.1161/P bit/μm
Disc Skew Margin |Θ|≦84.115(λ/NA$^3$/t)°
Eccentricity E≦67.57P μm
Surface Roughness |Ra|≦3λ/100 (in spot region)

The depth of pits or grooves which are provided for the surface of the substrate 2 will now be described.

The depth with which the most satisfactory degree of modulation can be obtained is λ/4. Therefore, the ROM or the like is structured to have the foregoing depth. When recording is performed by using grooves or lands such that a tracking error signal is obtained by a push-pull method, the push-pull signal is intensified maximally when the depth of the pit or the land is λ/8.

When data has been recorded on both lands and grooves, the depth of each groove must be determined in consideration of the characteristics of the crosstalk and crosserase in addition to the characteristics of the servo signal. As a result of experiments, the crosstalk is minimized when the depth of the groove is λ/6 to λ/3 When the depth is large, the crosserase is not affected. When both of the characteristics are satisfied in consideration of the inclination of the groove, an optimum depth is $3\lambda/8$. The high recording density optical disc 1 according to this embodiment can be applied to the foregoing depth range.

An optical system for recording and/or reproducing the foregoing optical disc 1 will now be described.

Figure 4:
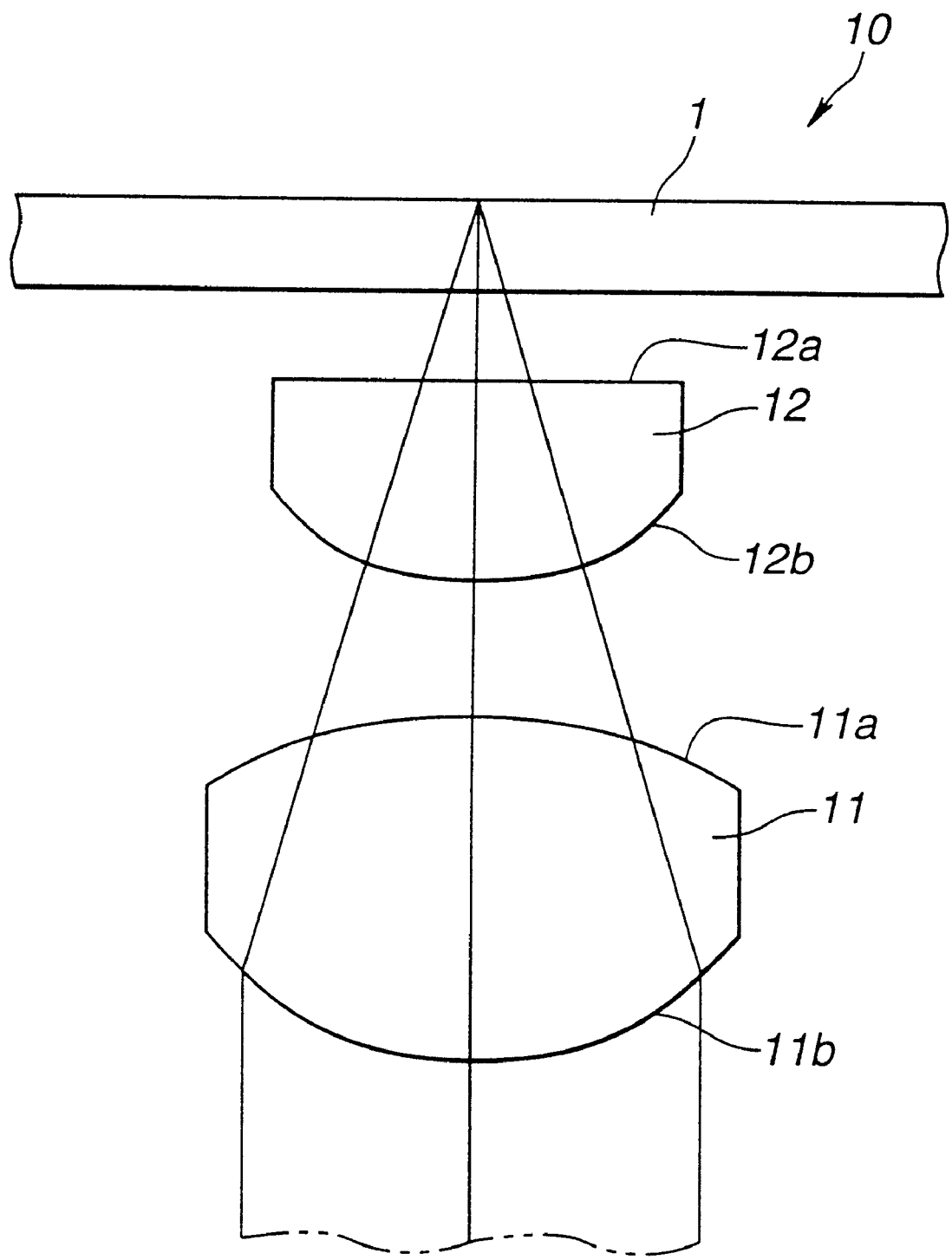
FIG. 4 is a schematic view showing an example of an optical system for recording and/or reproducing information with respect to the optical recording medium according to the present invention.

As shown in FIG. 4, the optical system 10 is formed into a two-group lens structure having a second lens 12 disposed between a first lens 11 and the optical disc 1. Since the optical system 10 is formed into the two-group lens structure, NA can be made to be 0.7 or greater. Thus, the distance (the working distance) between a first surface 12a of the second lens 12 and the surface of the optical disc 1 can be shortened. It is preferable that each of the first and second surfaces 11a and 11b of the first lens 11 and the first and second surfaces 12a and 12b of the second lens 12 is formed into a shape having an aspheric surface. Since the two-group lens is employed, high-density recording and/or reproducing of the foregoing optical disc 1 can be performed.

A method of manufacturing the optical disc 1 will now be described.

Figure 5:
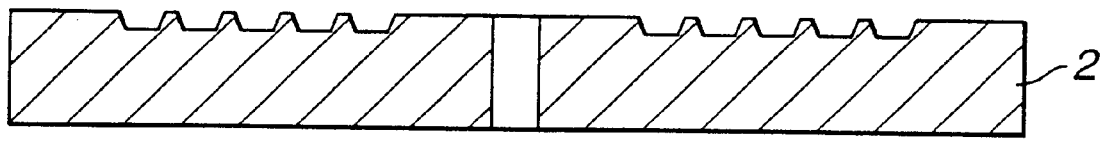
FIG. 5 is a cross sectional view showing a method of manufacturing the optical recording medium according to the present invention and a state in which a substrate has been manufactured by injection molding.
Figure 6:
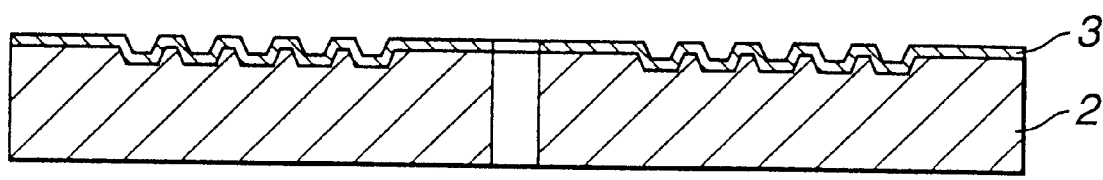
FIG. 6 is a diagram showing the manufacturing method and a state in which a reflecting film has been formed on the substrate.

Initially, resin is molded by injection molding so that the substrate 2 is manufactured as shown in FIG. 5. The substrate 2 must have somewhat great rigidity. Therefore, it is preferable that the thickness of the substrate 2 is 0.6 mm or larger. At this time, a predetermined projection and depression pattern is integrally formed on the substrate 2. At this time, a stamper having a pitch and irregularity of the pitch satisfying a required specification is used.

The accurate stamper free from considerable irregularity of the pitch cannot be realized by a conventional apparatus arranged to be fed by a screw Therefore, an original-disc exposing apparatus incorporating a feeding mechanism having a linear motor is employed to manufacture the foregoing stamper. The optical system of the exposing apparatus is covered with a cover body to prevent fluctuation of air. To prevent vibrations of cooling water for the exposing laser unit, it is preferable that a damping material is disposed between the laser emitting unit and the exposing apparatus.

The optical disc 1 has the reflecting film 3 formed on the projection and depression pattern formed on the substrate 2 so that light is applied from a position adjacent to the surface on which the reflecting film 3 has been formed so as to perform recording and/or reproducing. Therefore, the pits must be formed on the substrate 2 in consideration of deformation of the shapes of signals caused from formation of the reflecting film 3.

When the optical disc 1 is manufactured to have a recording capacity of, for example, 10 GB, the assymetry of signal pits viewed from a position opposite to the substrate 2 is 10% when the assymetry of the same viewed from the position adjacent to the substrate 2 is 25%. The optical disc 1 has a structure that a signal is read from the position opposite to the substrate 2. To form pits having the assymetry of 10% viewed from the light application portion, the assymetry of the pits which are formed on the substrate 2 must, therefore, be 25%.

The groove duty of guide grooves (the grooves) which are formed on the substrate 2 is changed owning to the recording film. When a groove-recording method is employed with which recording and/or reproducing of a recess when viewed from the recording and/or reproducing surface is performed, the width of the groove is reduced. Therefore, for example, a contrivance of enlarging the stamper for transferring the groove must be employed. When recording of both of the projections (lands) and grooves among the guide grooves are performed, the assymetry when viewed from the position adjacent to the substrate 2 must be 60% to 65% to obtain an assymetry of 50% when viewed from the light application portion.

Then, an Al film is formed on the surface of the substrate 2 on which the projection and depression pattern has been formed such that the thickness of the Al film is 20 nm to 60 nm. Thus, the reflecting film 3 is formed.

Figure 7:
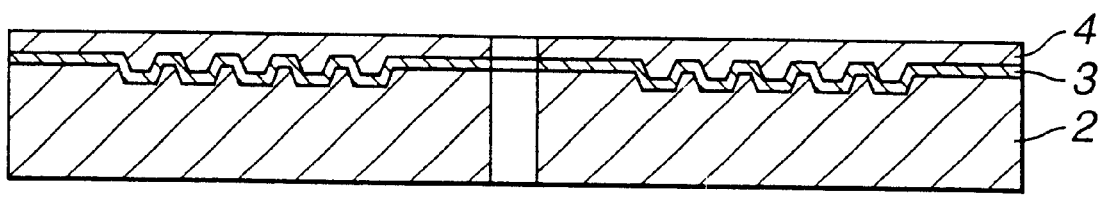
FIG. 7 is a diagram showing the manufacturing method and a state in which the light permeable layer has been formed on the reflecting film.

Then, as shown in FIG. 7, ultraviolet curing resin is applied to the reflecting film 3 by a spin coating method, followed by curing the ultraviolet curing resin. Thus, the light permeable layer 4 is formed. The thickness of the light permeable layer 4 is, for example, 10 $\mu$m to 177 $\mu$m. When the light permeable layer 4 is formed to have the above-mentioned thickness, it is preferable that ultraviolet curing resin having viscosity of 300 mPa·s or higher and 3000 mPa·s or lower is employed.

When the light permeable layer 4 is formed, the ultraviolet curing resin is dropped to a position apart from the center of the optical disc 1 for a distance of 25 mm in the radial direction. Then, the optical disc 1 is rotated to orient the ultraviolet curing resin. Thus, the relationship between centrifugal force generated owning to the rotations and the viscosity resistance of the ultraviolet curing resin causes aberration of the thickness of the light permeable layer 4 to occur between the inner portion and the outer portion. The amount of the aberration is 30 $\mu$m or greater.

To prevent the aberration of the thickness of the light permeable layer 4 between the inner portion and the outer portion, it is effective to employ the following procedure: the central opening of the substrate 2 is plugged by using a predetermined means when the ultraviolet curing resin is dropped. Then, the ultraviolet curing resin is dropped, followed by performing orientation and curing. Finally, the central hole is formed by punching.

Specifically, a polycarbonate sheet having a thickness of, for example, 0.1 mm is formed into a circular shape having a diameter of 30 mm so as to be bonded to the central hole of the substrate 2. Then, the ultraviolet curing resin is dropped to the surface of the polycarbonate sheet, followed by performing rotating orientation and curing. Then, the central hole is formed by punching. The above-mentioned method enables the aberration of the thickness of the light permeable layer 4 between the inner portion and the outer portion to be 10 $\mu$m or smaller.

Figure 8:
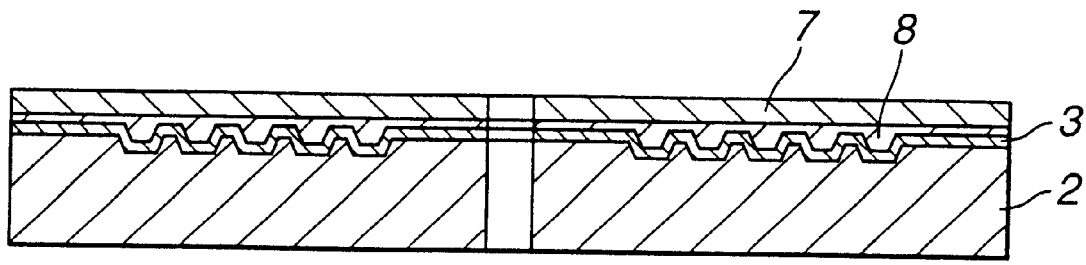
FIG. 8 is a diagram showing the manufacturing method and a state in which the light permeable layer has been formed on the reflecting film.

As shown in FIG. 8, the light permeable layer 4 may be formed by bonding a sheet 7 made of, for example, polycarbonate and having a thickness of 100 $\mu$m by the ultraviolet curing resin 8. In the foregoing case, the sum of the irregularity in the thickness of the sheet 7 and that of the bonding ultraviolet curing resin 8 must be 10 $\mu$m. For example, the following procedure is employed: the sheet 7 formed to have the same diameter as that of the substrate 2 is applied to the substrate 2 through the bonding ultraviolet curing resin 8. Then, rotating orientation is performed, and then the light permeable layer is formed. Thus, the irregularity in the thickness of the light permeable layer 4 can be made to be 10 $\mu$m or smaller.

To prevent squeezing of the ultraviolet curing resin 8 over the substrate 2 when the light permeable layer 4 is formed, it is preferable that the maximum diameter of the substrate 2 is 120 mm+5 mm with respect to the diameter (120 mm) of the CD or the like.

Figure 9:
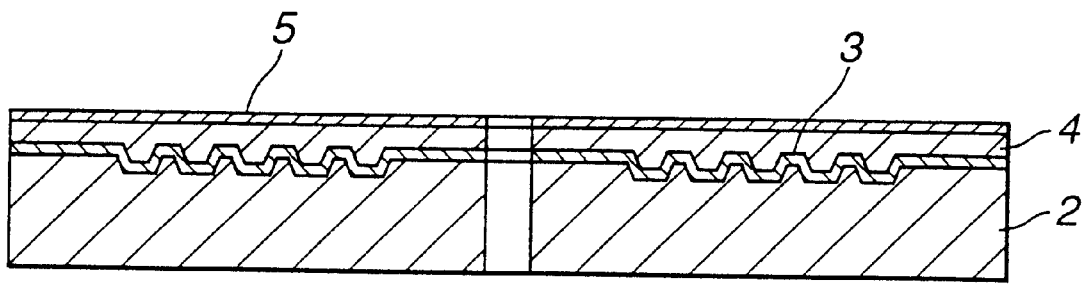
FIG. 9 is a diagram showing the manufacturing method and a state in which a surface layer has been formed on the light permeable layer.

Then, as shown in FIG. 9, the inorganic material, such as $SiN_x$, $SiO_x$ or SiC is applied to the surface of the light permeable layer 4 by, for example, sputtering. Thus, the light permeable surface layer 5 is formed. It is preferable that the thickness of the surface layer 5 is 10 angstrom to 2000 angstrom. Specifically, the thickness is 1000 angstrom.

When the surface layer 5 is made of, for example, indium oxide, tin oxide, their complexes or amorphous carbon, conductivity can be imparted to the surface layer 5. In the foregoing case, the thickness of the surface layer 5 is about 500 angstrom. Since the surface layer 5 has the conductivity, electrification of the surface of the optical disc 1 can be prevented and adhesion of dust or the like can be prevented.

Then, the surface layer 5 is coated with the carboxylic acid amine salt expressed by general formula (1) and/or general formula (2).

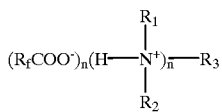

(1)

where n is an integer from 1 to 3, each of $R_1$, and $R_2$ is hydrogen or a hydrocarbon group, $R_3$ is a hydrocarbon group and $R_f$ is a perfluoroalkyl group having three or more carbon atoms,

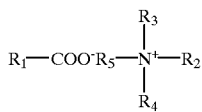

(2)

where at least either of $R_1$, and $R_2$, is perfluoroalkyl group having three or more carbon atoms, at least any one of $R_1$, $R_2$, $R_3$, $R_4$ and $R_5$ is hydrocarbon group having 12 or more carbon atoms and the rest of them are hydrogen or hydrocarbon group.

The foregoing carboxylic acid amine salt is prepared from, for example, perfluoroalkyl carboxylic acid and organic amine.

The carboxylic acid incorporating the perfluoroalkyl group can be obtained by, for example, a method suggested by N. O. Brace (J. Org. Chem., vol. 27 (1962) pp. 4491).

The long-chain organic amine can easily be obtained by refining a commercial item. As an alternative to this, carboxylic acid chloride ($C_{23}H_{47}COCl$) obtained by heating corresponding carboxylic acid (for example, $C_{23}H_{47}COOH$) together with thionyl chloride ($SOCl_2$) is gradually added to ammonia water at 5° C. or lower so that carboxylate amide ($C_{23}H_{47}CONH_2$) is obtained. Then, the carboxylate amide is reduced with lithium aluminum hydroxide ($LiAlH_4$) in ether anhydride so that the long-chain organic amine is obtained.

The foregoing carboxylic acid amine salt can easily be prepared by a method disclosed by Kondo et al. (J. Mag. Soc. Jpn, vol. 13, suppl. No. SI (1989) p.213).

To apply the carboxylic acid amine salt to the surface layer 5, for example, a method is employed with which solution obtained by dissolving the carboxylic acid amine salt in solvent is applied or sprayed to the surface of the surface layer 5. As an alternative to this, the optical disc 1 may be immersed in the foregoing solution so that the carboxylic acid amine salt is caused to exist on the surface of the surface layer 5.

In this embodiment, the read-only (ROM) type optical disc 1 incorporating the reflecting film 3 formed on the substrate 2 has been described. The present invention is not limited to this. The present invention can be applied to a reloadable optical disc and a write-once optical disc. The reloadable optical disc is exemplified by a magneto-optical disc using a magneto-optical effect or a phase-change type optical disc incorporating a recording layer made of a phase-change material.

The recording layer of the magneto-optical disc is constituted by sequentially forming, for example, an Al film, a $SiN_x$ film, a TeFeCo film and a $SiN_x$ film in this order. The Al film serves as a reflecting film, while the TeFeCo film serves as a recording film having a magneto-optical effect. The $SiN_x$ film serves as a dielectric film.

The recording layer of the phase-change type optical disc is constituted by sequentially forming, for example, an Al film, a $ZnS$—$SiO_2$ film, a GeSbTe film and a $ZnS$—$SiO_2$ film in this order. The Al film serves as a reflecting film, the GeSbTe film serves as the recording film, the phase of which is changed. The $ZnS$—$SiO_2$ film serves as a dielectric film.

The recording layer of the write-once optical disc is formed by forming Au or Al on a substrate by sputtering so that a reflecting film is formed. Then, the reflecting film is coated with metallocyanine or phthalocyanine type organic coloring matter film by spin coating, followed by performing a drying process.

Figure 10:
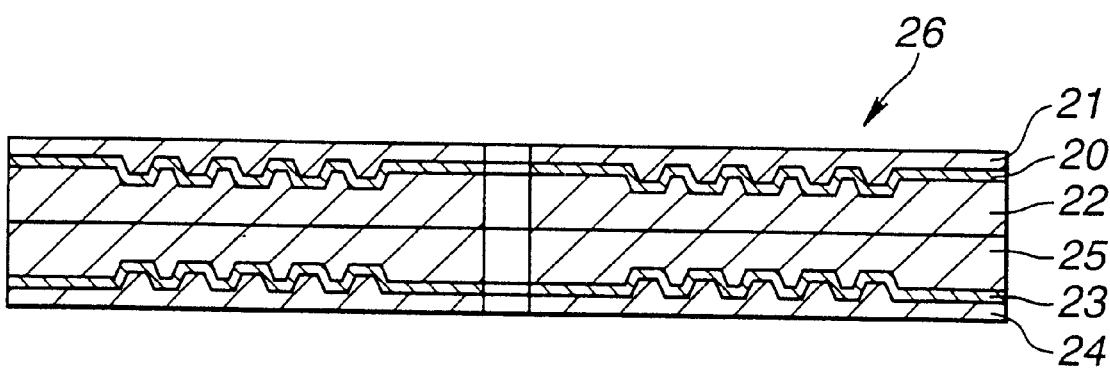
FIG. 10 is a cross sectional view showing another embodiment of the optical recording medium according to the present invention.
Figure 11:
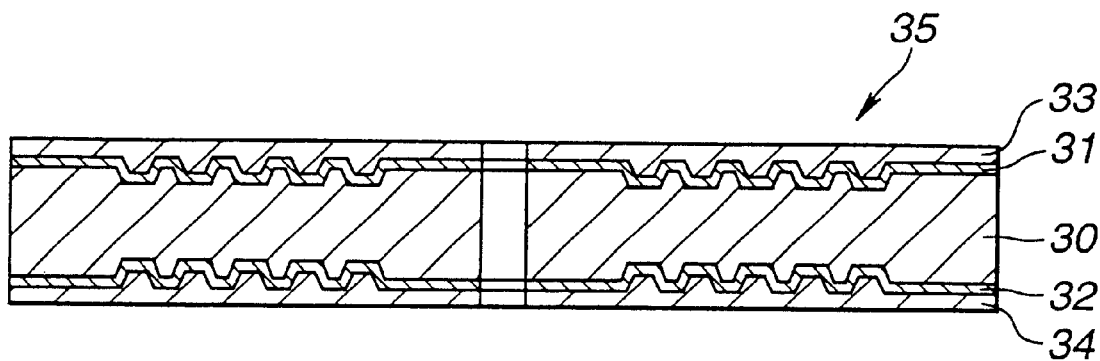
FIG. 11 is a cross sectional view showing another embodiment of the optical recording medium according to the present invention.
Figure 12:
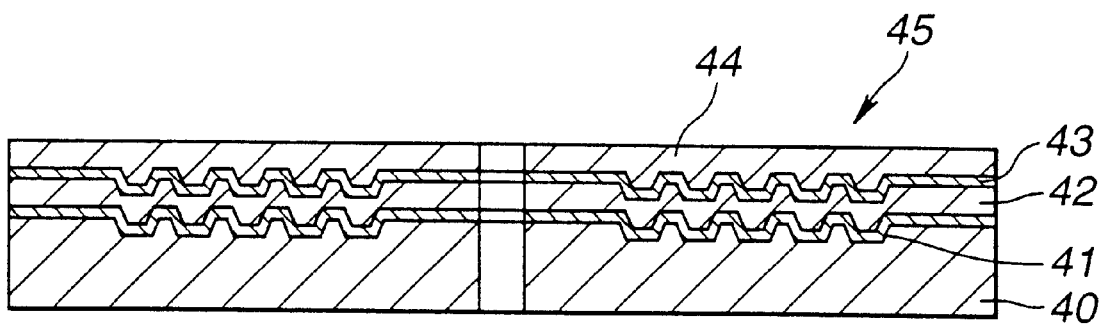
FIG. 12 is a cross sectional view showing another embodiment of the optical recording medium according to the present invention.

The optical disc 1 according to this embodiment has a single-plate structure having the reflecting film 3 formed on either surface of one substrate 2. For example, the present invention can be applied to an optical disc 26 structured as shown in FIG. 10 and incorporating a first substrate 22 which has a recording layer 20 and a light permeable layer 21. The optical disc 26 incorporates a second substrate 25 which has a recording layer 23 and a light permeable layer 24. Moreover, the first and second substrates 22 and 25 are bonded to each other. The present invention can be applied to an optical disc 35 incorporating recording layers 31 and 32 and light permeable layers 33 and 34 formed on two sides of one substrate 30, as shown in FIG. 11. Moreover, the present invention can be applied to a multi-layered optical disc 45 structured as shown in FIG. 12 and incorporating a first recording layer 41 of a substrate 40 on which a second recording layer 43 is formed through an intermediate layer 42; and a light permeable layer 44 formed on the second recording layer 43. When the optical disc is structured as shown in FIG. 10 such that tow substrates are bonded to each other, the thickness of each substrate is half of the thickness of the substrate of a single-plate optical disc.

In the foregoing embodiment, the resin material is injection-molded so that the substrate having a predetermined projection and depression pattern formed thereon is obtained. The projection and depression pattern may be formed on the substrate as follows.

Figure 13:
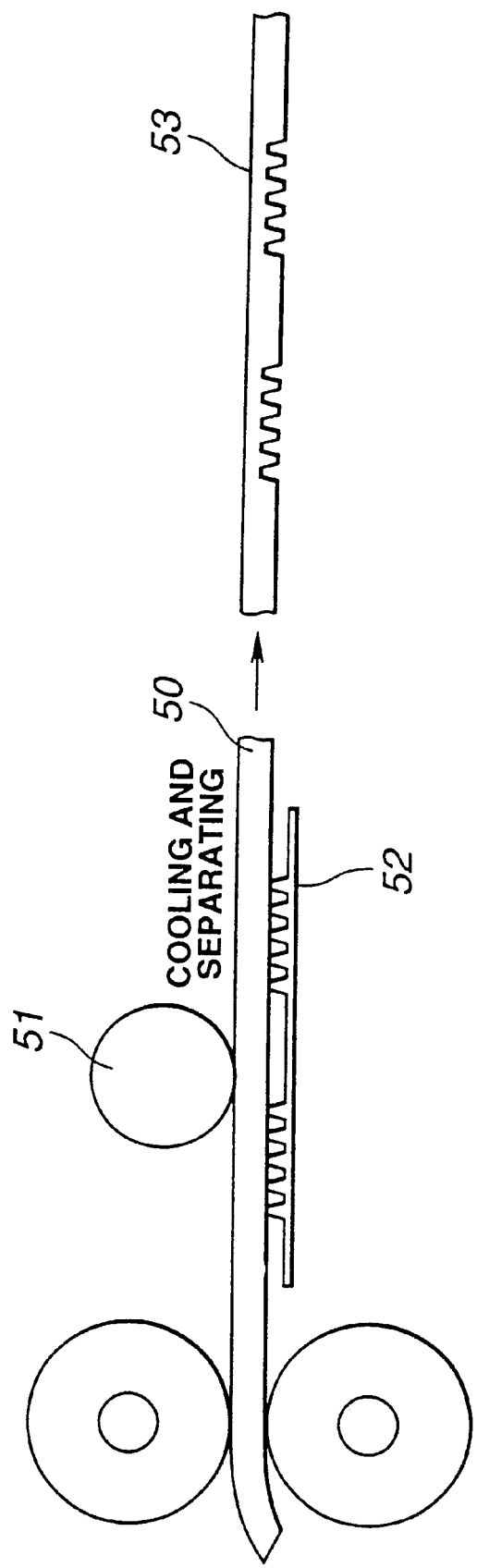
FIG. 13 is a diagram showing another method of manufacturing the optical recording medium according to the present invention and a state in which projections and depressions of a stamper are transferred to a sheet.
Figure 14:
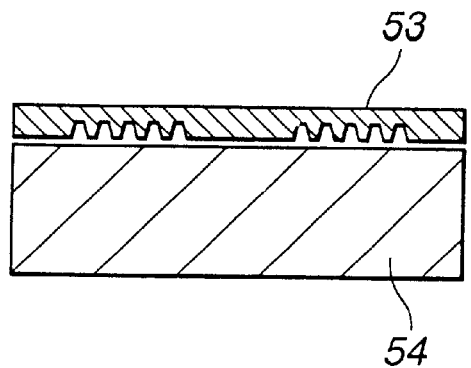
FIG. 14 is a cross sectional view showing another embodiment of the optical recording medium according to the present invention.

Initially, a sheet 50 manufactured by extruding or casting and made of polycarbonate is prepared. The thickness of the sheet 50 is, for example, about Then, as shown in FIG. 13, the sheet 50 is pressed against a stamper 52 by a roller 51. The stamper 52 is previously heated to a temperature higher than the glass transition temperature of the material of the sheet 50. When the sheet 50 is pressed against the stamper 52 under a stress of, for example, 2750N so that the projection and depression pattern of the stamper 52 is transferred. Then, the sheet 50 and the stamper 52 are cooled, and then the sheet 50 is separated from the stamper 52. Thus, a thin-plate substrate 53 having the projection and depression pattern formed thereon can be obtained Then, the recording layer or the reflecting film is formed on the thin-plate substrate 53 by the above-mentioned method.

Then, the ultraviolet curing resin is dropped to the surface of the transparent substrate 54 which has individually been manufactured by injection molding and which has a thickness of about 1.1 mm. Then, the thin-plate substrate 53 is placed on the ultraviolet curing resin layer, followed by pressing the thin-plate substrate 53 Ultraviolet rays are applied from a position adjacent to the transparent substrate 54 so that the ultraviolet curing resin is cured. Thus, the thin-plate substrate 53 and the transparent substrate 54 are bonded to each other so that the optical disc is manufactured.

Figure 15:
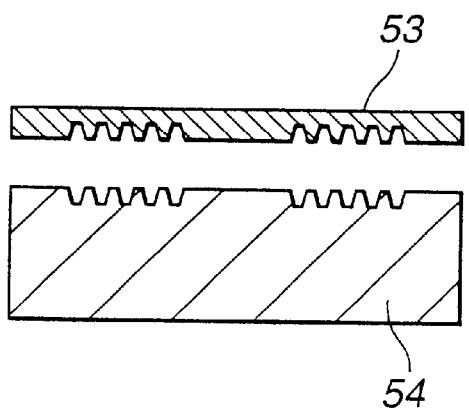
FIG. 15 is a cross sectional view showing another embodiment of the optical recording medium according to the present invention.
Figure 16:
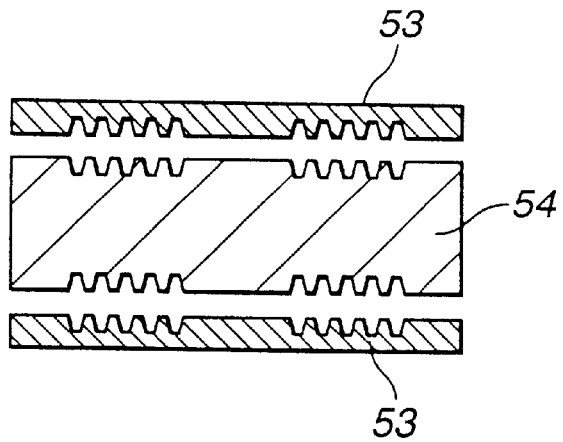
FIG. 16 is a cross sectional view showing another embodiment of the optical recording medium according to the present invention.

When the transparent substrate 54 is injection-molded, a predetermined projection and depression pattern is previously provided for the transparent substrate 54. Thus, an optical disc having a two-layered structure as shown in FIG. 15 and an optical disc having a four-layered structure as shown in FIG. 16 can be manufactured.

EXAMPLES

Examples of the present invention will now be described. As a matter of course, the present invention is not limited to the following examples.

Initially, a substrate was manufactured by injection-molding the resin material by using the stamper. At this time, a projection and depression pattern was integrally formed on either main surface of the substrate. Then, an Al film, a $SiN_x$ film, a TeFeCo film and a $SiN_x$ film were sequentially formed on the surface of the substrate on which the projection and depression pattern was formed in this order so that a recording layer was formed. Then, the recording layer was coated with the ultraviolet curing resin, and then the ultraviolet curing resin was cured. Thus, a light permeable layer having a thickness of 20 $\mu$m was formed. Then, a $SiN_x$ was applied to the surface of the light permeable layer to have a thickness of 160 nm by sputtering so that a surface layer was formed. Finally, a compound 1 shown in Table 1 was dissolved in mixed solvent of hexane and ethanol, followed by performing top-coating such that the amount of the material for coating was 5 mg/m$^2$. Thus, an optical disc was manufactured. Note that the obtained optical disc was a magneto-optical disc incorporating the TeFeCo film which had the magneto-optical effect.

The conditions of the manufactured optical disc were as follows:

Recording and Reproducing Optical System:
$\lambda \leq 0.68$ $\mu$m
$NA/\lambda \geq 1.25$
Thickness of Light Permeable Layer:
$t = 20$ $\mu$m
Irregularity of Thickness of Light Permeable Layer:
$|\Delta t| \leq 5.0$ $\mu$m
Track Pitch $P \leq 0.64$ $\mu$m
Allowance $|\Delta p| \leq 0.04P$
Linear Density $d \leq 0.1161/P$ bit/$\mu$m
Disc Skew Margin $|\Theta| \leq 0.4°$
Eccentricity $E \leq 67.57$ P$\mu$m
Surface Roughness $|Ra| \leq 3\lambda/100$ (in spot region)

Optical discs were manufactured such that the compounds with which the surface layer was top-coated were changed variously. Optical discs top-coated with compounds 1 to 18 as shown in Table 1 which were perfluoroalkyl carboxylic acid amine salt were manufactured which were called Examples 1 to 18.

An optical disc free from top coating was called a Comparative Example 1. An optical disc top-coated with compound 19, which was perfluoroalkyl carboxylate amide employed in place of the carboxylic acid amine salt, was called Comparative Example 2. An optical disc top-coated with compound 20 was perfluoroalkyl carboxylate ester employed in place of the carboxylic acid amine salt was called Comparative Example 3.

The compounds with which the optical discs were top-coated were shown in Table 1.

TABLE 1

| Compound 1 | $C_9F_{19}COO^-H_3N^+C_{18}H_{37}$ |
|---|---|
| Compound 2 | $C_8F_{17}COO^-H_3N^+C_{24}H_{49}$ |
| Compound 3 | $C_7F_{15}COO^-H_3N^+(CH_2)_{12}N^+H_3{}^-OCOC_7F_{15}$ |
| Compound 4 | $C_8F_{17}COO^-H_3N^+(CH_2)_{12}N^+H_3{}^-OCOC_8F_{17}$ |
| Compound 5 | $C_8F_{17}COO^-H_3N^+(CH_2)_4N^+H_3{}^-OCOC_8F_{17}$ |
| Compound 6 | $C_8F_{17}COO^-H_2N^+C_{18}H_{17}$ <br> $\qquad\qquad\qquad\;\;|$ <br> $\qquad\qquad\qquad CH_3$ |
| Compound 7 | $C_9F_{19}COO^-HN^+C(C_2H_5)_3$ |
| Compound 8 | $C_9F_{19}COO^-H_3N^+{-}C_6H_4{-}N^+H_3{}^-OCOC_9F_{19}$ |
| Compound 9 | $C_7F_{15}COO^-H_3N^+C_{12}H_{25}$ |
| Compound 10 | $C_7F_{15}COO^-H_3N^+C_{15}H_{31}$ |
| Compound 11 | $C_9F_{19}COO^-H_3N^+{-}C_6H_5$ |
| Compound 12 | $C_7F_{15}COO^-H_3N^+{-}C_6H_4{-}N^+H_3{}^-OCOC_7F_{15}$ |
| Compound 13 | $C_7F_{15}COO^-H_3N^+C_{18}H_{37}$ |
| Compound 14 | $C_{17}H_{35}COO^-H_3N^+(CH_2)_{11}(CF_2)_2CF_3$ |
| Compound 15 | $C_{17}H_{35}COO^-H_3N^+(CH_2)_{11}(CF_2)_4CF_3$ |
| Compound 16 | $C_{17}H_{35}COO^-H_3N^+(CH_2)_{11}(CF_2)_5CF_3$ |
| Compound 17 | $CH_2{=}CH(CH_2)_{15}COO^-H_3N^+(CH_2)_{11}(CF_2)_6CF_3$ |
| Compound 18 | $CH_2{=}CH(CH_2)_{13}COO^-H_3N^+(CH_2)_{11}(CF_2)_7CF_3$ |
| Compound 19 | $C_9F_{19}CONHC_{18}H_{37}$ |
| Compound 20 | $C_9F_{19}COOC_{18}H_{37}$ |

The manufactured optical discs were subjected to experiments to evaluate sliding resistance, coefficients of friction and antistatic effects.

The sliding resistance was evaluated by using an optical pickup having an objective lens having a high NA. The optical disc was slid 100 times while a small shearing load of 0.02 N was being applied. Thus, change in the error rate which has occurred owning to the sliding was measured. Also damage of the optical disc caused from a shock of collision between the optical disc and the optical pickup was observed and evaluated.

The coefficient of friction was evaluated by measuring shearing force simultaneously with the sliding test. Then the coefficient of surface friction realized after 100 times of sliding operations was calculated.

The antistatic effect was evaluated such that voltage of 8.5 kV was applied to the optical disc for one minute. Then, time taken for the voltage to be lowered to 4.25 kV which was half of the applied voltage, that is, the half-life was measured.

Results of the evaluation of the sliding resistance, the coefficient of friction and the antistatic effect of each optical disc were shown in Table 2.

TABLE 2

| | Change in Error Rate | Damage of Medium |
|---|---|---|
| Example 1 | $2.5 \times 10^{-4} \rightarrow 2.8 \times 10^{-4}$ | no damage |
| Example 2 | $2.6 \times 10^{-4} \rightarrow 2.9 \times 10^{-4}$ | no damage |
| Example 3 | $2.4 \times 10^{-4} \rightarrow 3.0 \times 10^{-4}$ | no damage |
| Example 4 | $2.4 \times 10^{-4} \rightarrow 2.8 \times 10^{-4}$ | no damage |
| Example 5 | $2.5 \times 10^{-4} \rightarrow 2.9 \times 10^{-4}$ | no damage |
| Example 6 | $2.5 \times 10^{-4} \rightarrow 3.3 \times 10^{-4}$ | no damage |
| Example 7 | $2.9 \times 10^{-4} \rightarrow 4.2 \times 10^{-4}$ | slight damage |
| Example 8 | $2.6 \times 10^{-4} \rightarrow 3.1 \times 10^{-4}$ | no damage |
| Example 9 | $2.9 \times 10^{-4} \rightarrow 4.3 \times 10^{-4}$ | slight damage |
| Example 10 | $2.4 \times 10^{-4} \rightarrow 2.8 \times 10^{-4}$ | no damage |
| Example 11 | $2.7 \times 10^{-4} \rightarrow 4.7 \times 10^{-4}$ | slight damage |
| Example 12 | $2.5 \times 10^{-4} \rightarrow 3.8 \times 10^{-4}$ | no damage |
| Example 13 | $2.5 \times 10^{-4} \rightarrow 2.9 \times 10^{-4}$ | no damage |
| Example 14 | $2.8 \times 10^{-4} \rightarrow 4.2 \times 10^{-4}$ | slight damage |
| Example 15 | $2.3 \times 10^{-4} \rightarrow 2.7 \times 10^{-4}$ | no damage |

TABLE 2-continued

| | Change in Error Rate | Damage of Medium |
|---|---|---|
| Example 16 | $2.6 \times 10^{-4} \to 4.6 \times 10^{-4}$ | slight damage |
| Example 17 | $2.4 \times 10^{-4} \to 3.7 \times 10^{-4}$ | no damage |
| Example 18 | $2.4 \times 10^{-4} \to 2.8 \times 10^{-4}$ | no damage |
| Comparative Example 1 | $5.1 \times 10^{-4} \to 1.2 \times 10^{-2}$ | great and deep flaw |
| Comparative Example 2 | $3.2 \times 10^{-4} \to 4.7 \times 10^{-3}$ | damaged |
| Comparative Example 3 | $4.5 \times 10^{-4} \to 9.5 \times 10^{-3}$ | damaged |

| | Coefficient of Friction | Half Life (s) |
|---|---|---|
| Example 1 | 0.18 | 1 |
| Example 2 | 0.21 | 2 |
| Example 3 | 0.19 | 1 |
| Example 4 | 0.18 | 1 |
| Example 5 | 0.20 | 1 |
| Example 6 | 0.22 | 3 |
| Example 7 | 0.25 | 3 |
| Example 8 | 0.19 | 4 |
| Example 9 | 0.24 | 1 |
| Example 10 | 0.19 | 1 |
| Example 11 | 0.24 | 3 |
| Example 12 | 0.21 | 2 |
| Example 13 | 0.18 | 1 |
| Example 14 | 0.23 | 1 |
| Example 15 | 0.18 | 1 |
| Example 16 | 0.23 | 3 |
| Example 17 | 0.20 | 1 |
| Example 18 | 0.17 | 1 |
| Comparative Example 1 | 0.52 | 50 |
| Comparative Example 2 | 0.35 | 21 |
| Comparative Example 3 | 0.48 | 18 |

The optical disc according to Example 1 to 18 were substantially free from rise in the error rate owning to sliding or the like in any case and damage of the medium. Moreover, the foregoing optical discs had very small coefficient of friction. Therefore, even if each of the optical discs was brought into contact with the optical pickup and thus brought to a sliding state, stable rotation was permitted. As a result, high-density recording and/or reproducing was performed. Moreover, each of the optical disc had an excellent antistatic effect.

The optical disc according to Comparative Example 1 and free from the top coating process had a multiplicity of problems of rise in the error rate, damage of the medium and unsatisfactory coefficient of friction and antistatic characteristic. Therefore, the optical disc according to the comparative example was not suitable to serve as a high-density recording medium having a short working distance. The optical discs according to Comparative Examples 2 and 3 top-coated with carboxylic acid amine salt and the carboxylate ester, respectively, had characteristics superior to those of the optical disc according to Comparative Example 1. However, satisfactory results to serve as the high-density recording medium were not realized.

Therefore, top-coating of the surface layer with the carboxylic acid amine salt enables a flaw of the surface of the disc and adhesion of dust or the like to the surface of the disc to be prevented. As a result, signal errors can be reduced.

As described above, the optical recording medium according to the present invention has the structure that the carboxylic acid amine salt is held on the surface which is irradiated with light for the purpose of recording and/or reproducing a signal. Therefore, damage of the surface and adhesion of dust or the like to the surface can be prevented. Hence it follows that the optical recording medium according to the present invention is able to prevent increase in a recording and/or reproducing error when the working distance is shortened. As a result, the optical recording medium according to the present invention is able to raise the density of recording signals.

Although the invention has been described in its preferred form and structure with a certain degree of particularity, it is understood that the present disclosure of the preferred form can be changed in the details of construction and in the combination and arrangement of parts without departing from the spirit and the scope of the invention as hereinafter claimed.

What is claimed is:

1. An optical recording medium, comprising:
    a supporting body;
    a recording portion which is formed on a main surface of the supporting body and on which signals can be recorded;
    a light permeable layer formed on the recording portion; and
    a carboxylic acid amine salt provided on a surface of the optical recording medium via which light is irradiated onto the recording portion expressed by the general formula

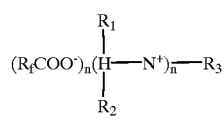

(1)

wherein n is an integer from 1 to 3, each of $R_1$ and $R_2$ represent a hydrogen atom or a hydrocarbon group, $R_3$ represents a hydrocarbon group, and $R_f$ represents a perfluoroalkyl group having three or more carbon atoms.

2. An optical recording medium according to claim 1, wherein said light permeable layer has a thickness t of 10 μm to 177 μm.

3. An optical recording medium according to claim 1, wherein when an assumption is made that the irregularity of the thickness of said light permeable layer is Δt, said light permeable layer satisfies the following relationship with numerical aperture NA of an optical system for performing recording and/or reproducing and wavelength λ:

$$|\Delta t| \leq 5.26(\lambda/NA^4) \mu m.$$

4. An optical recording medium according to claim 1, wherein the pencil hardness of the surface of the optical recording medium via which light is irradiated is H or greater.

5. An optical recording medium according to claim 1, wherein the resistance of the surface of the optical recording medium via which light is irradiated is $10^{13}$ Ω or lower.

6. An optical recording medium according to claim 1, wherein the dynamic coefficient of friction of the surface of the optical recording medium via which light is irradiated is 0.3 or smaller.

7. An optical recording medium, comprising:
    a supporting body;
    a recording portion which is formed on a main surface of the supporting body and on which signals can be recorded;

a light permeable layer formed on the recording portion;

a surface layer formed on the light permeable layer via which light is irradiated onto said recording portion; and a carboxylic acid amine salt provided on the surface layer expressed by the general formula (1):

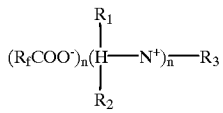

(1)

wherein n is an integer from 1 to 3, each of $R_1$ and $R_2$ represents a hydrogen atom or a hydrocarbon group, $R_3$ represents a hydrocarbon group, and $R_f$ represents a perfluoroalkyl group having three or more carbon atoms.

8. An optical recording medium according to claim 7, wherein the surface layer comprises an inorganic material.

9. An optical recording medium according to claim 8, wherein the inorganic material is selected from the group consisting of $SiN_x$, SiC, and $SiO_x$.

10. An optical recording medium according to claim 8, wherein the surface layer is formed by a sputtering method or a spin coating method and the thickness of the surface layer is 1 nm to 200 nm.

11. An optical recording medium according to claim 7, wherein the surface layer comprises an inorganic material having conductivity.

12. An optical recording medium according to claim 11, wherein the inorganic material having conductivity is selected from the group consisting of indium oxide, tin oxide, and their complexes.

13. An optical recording medium according to claim 11, wherein the surface layer is formed by a sputtering method or a spin coating method and the thickness of the surface layer is 1 nm to 200 nm.

14. An optical recording medium according to claim 7, wherein the surface layer comprises an organic resin.

15. An optical recording medium according to claim 14, wherein the surface layer is formed by a spin coating method and the thickness of the surface layer is 0.1 $\mu$m to 10 $\mu$m.

16. An optical recording medium according to claim 14, wherein the an organic resin comprises a powder of oxides having at least one material selected from the group consisting of In, Sn, and Zn, and the surface layer is formed by a spin coating method to have a thickness of 0.1 $\mu$m to 100 $\mu$m.

17. An optical recording medium according to claim 14, wherein the surface tension of the surface layer is smaller than the critical surface tension of the light permeable layer.

18. An optical recording medium according to claim 14, wherein the water absorption of the surface layer is higher than the water absorption of the light permeable layer.

19. An optical recording medium according to claim 7, wherein the surface layer has conductivity.

20. An optical recording medium, comprising:

a supporting body;

a recording portion which is formed on a main surface of the supporting body and on which signals can be recorded;

a light permeable layer formed on the recording portion; and a carboxylic acid amine salt provided on a surface of the optical recording medium via which light is irradiated onto said recording portion expressed by the general formula

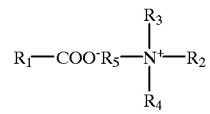

(2)

wherein at least one of $R_1$ and $R_2$ represents a perfluoroalkyl group having three or more carbon atoms, at least one of $R_1$, $R_2$, $R_3$, $R_4$, and $R_5$ represents a hydrocarbon group having 12 or more carbon atoms and the remainder of $R_1$, $R_2$, $R_3$, $R_4$, and $R_5$ represent a hydrogen atom or a hydrocarbon group.

21. An optical recording medium according to claim 20, wherein the light permeable layer has a thickness t of 10 $\mu$m to 177 $\mu$m.

22. An optical recording medium according to claim 20, wherein when the irregularity of the thickness of the light permeable layer is $\Delta t$, the light permeable layer satisfies the following relationship with numerical aperture NA of an optical system for performing recording and/or reproducing and wavelength $\lambda$:

$|\Delta t| \leq 5.26(\lambda/NA^4) \mu m$.

23. An optical recording medium according to claim 20, wherein the pencil hardness of the surface of the optical recording medium via which light is irradiated is H or greater.

24. An optical recording medium according to claim 20, wherein the resistance of the surface of the optical recording medium via which light is irradiated is $10^{13}$ $\Omega$ or lower.

25. An optical recording medium according to claim 20, wherein the dynamic coefficient of friction of the surface of the optical recording medium via which light is irradiated is 0.3 or smaller.

26. An optical recording medium, comprising:

a supporting body;

a recording portion which is formed on a main surface of the supporting body and on which signals can be recorded;

a light permeable layer formed on the recording portion;

a surface layer formed on the light permeable layer via which light is irradiated onto said recording portion; and a carboxylic acid amine salt provided on the surface layer expressed by the general formula (2):

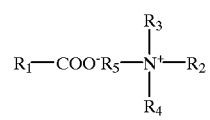

(2)

wherein at least either of $R_1$ and $R_2$ represent a perfluoroalkyl group having three or more carbon atoms, at least any one of $R_1$, $R_2$, $R_3$, $R_4$, and $R_5$ represent a hydrocarbon group having 12 or more carbon atoms and the remainder of $R_1$, $R_2$, $R_3$, $R_4$, and $R_5$ represent a hydrogen atom or hydrocarbon group.

27. An optical recording medium according to claim 26, wherein the surface layer comprises an inorganic material.

28. An optical recording medium according to claim 27, wherein the inorganic material is selected from the group consisting of $SiN_x$, SiC, and $SiO_x$.

29. An optical recording medium according to claim 27, wherein the surface layer is formed by a sputtering method or a spin coating method and the thickness of the surface layer is 1 nm to 200 nm.

30. An optical recording medium according to claim 26, wherein the surface layer comprises an inorganic material having conductivity.

31. An optical recording medium according to claim 30, wherein the inorganic material having conductivity is selected from the group consisting of indium oxide, tin oxide, and their complexes.

32. An optical recording medium according to claim 30 wherein the surface layer is formed by a sputtering method or a spin coating method and the thickness of the surface layer is 1 nm to 200 nm.

33. An optical recording medium according to claim 26, wherein the surface layer comprises an organic resin.

34. An optical recording medium according to claim 33, wherein the surface layer is formed by a spin coating method and the thickness of the surface layer is 0.1 $\mu$m to 10 $\mu$m.

35. An optical recording medium according to claim 33, wherein the surface layer comprises an organic resin in which powder of oxides having at least one material selected from the group consisting of In, Sn, and Zn are mixed, and the surface layer is formed by a spin coating method to have a thickness of 0.1 $\mu$m to 100 $\mu$m.

36. An optical recording medium according to claim 33, wherein the surface tension of the surface layer is smaller than the critical surface tension of the light permeable layer.

37. An optical recording medium according to claim 33, wherein water absorption of the surface layer is higher than the water absorption of the light permeable layer.

38. An optical recording medium according to claim 26, wherein the surface layer has conductivity.

* * * * *